US012781537B1

(12) United States Patent
Chen

(10) Patent No.: US 12,781,537 B1
(45) Date of Patent: Nov. 3, 2026

(54) DOOR LOCK CONTROL DEVICE

(71) Applicant: Te-Yu Chen, Pingtung City (TW)

(72) Inventor: Te-Yu Chen, Pingtung City (TW)

( * ) Notice: Subject to any disclaimer, the term of this patent is extended or adjusted under 35 U.S.C. 154(b) by 0 days.

(21) Appl. No.: 19/221,568

(22) Filed: May 29, 2025

(51) Int. Cl.
*E05B 47/00* (2006.01)

(52) U.S. Cl.
CPC .. *E05B 47/0004* (2013.01); *E05B 2047/0016* (2013.01)

(58) Field of Classification Search
CPC ............. E05B 47/0004; E05B 47/0001; E05B 2047/0016; E05B 2047/0024; E05B 2047/0026; E05B 2047/0014; E05B 2047/0037; E05B 2047/0676; E05B 17/2084; E05B 13/005; E05B 3/065; E05B 55/06; E05B 15/04; E05B 2015/0496; E05B 2015/0437; E05B 2015/0451; Y10T 292/85
USPC ................................................. 70/277, 287.7
See application file for complete search history.

(56) References Cited

U.S. PATENT DOCUMENTS 4,762,212 A * 8/1988 Fish ...................... E05B 13/004 192/24
4,810,014 A * 3/1989 McGourty .......... E05B 47/0012 292/144
4,820,330 A * 4/1989 Lin ..................... E05B 47/0676 70/277
4,861,083 A * 8/1989 Fish ...................... E05B 13/004 292/336.3
5,617,749 A * 4/1997 Park ........................ E05B 3/065 292/336.3
6,725,693 B2 * 4/2004 Yu ......................... E05B 47/068 292/144
11,235,659 B2 * 2/2022 Dvorak .................. B60K 15/05
11,597,270 B2 * 3/2023 Hegwein ................ B60K 15/05
12,060,731 B2 * 8/2024 Jones .................. E05B 47/0012
12,486,693 B2 * 12/2025 Chen ........................ E05B 3/065
2013/0069290 A1 * 3/2013 Chen ........................ E05B 3/065 267/150
2019/0390478 A1 * 12/2019 Xiang ..................... E05B 1/003

FOREIGN PATENT DOCUMENTS

CN 206290097 U * 6/2017 ............. E05B 47/00
CN 107035230 A * 8/2017 ......... E05B 47/0012
CN 108179923 A * 6/2018 ......... E05B 47/0012
CN 108590346 A * 9/2018 ............. E05B 15/00
CN 108979336 A * 12/2018 ......... E05B 47/0012
(Continued)

*Primary Examiner* — Steven A Tullia
(74) *Attorney, Agent, or Firm* — Leong C. Lei

(57) ABSTRACT

A door lock control device includes a base, and an actuation member, a rotary disk, a slide rail, and a push block arranged on the base and a transmission unit arranged on a lower side of the base. The rotary disk is arranged in the center of the base, and the actuation member is arranged at one side of the rotary disk and includes a support portion. The slide rail and the push block are arranged along a periphery of the rotary disk. The transmission unit includes a push bar having a top end in engagement with the support portion of the actuation member. When the transmission unit is actuated, the actuation member is driven to move the slide rail toward the rotary disk, so that the rotary disk may drive the slide rail and the push block to move, otherwise the rotary disk is set in an idling state.

5 Claims, 6 Drawing Sheets

(56) References Cited

FOREIGN PATENT DOCUMENTS

| | | | | | |
|---|---|---|---|---|---|
| GB | 2588170 | A | * | 4/2021 | E05B 47/0692 |
| GB | 2599985 | A | * | 4/2022 | E05B 63/0065 |
| KR | 0137746 | Y1 | * | 4/1999 | E05B 3/06 |
| KR | 200391810 | Y1 | * | 8/2005 | E05B 47/00 |
| KR | 20050112589 | A | * | 12/2005 | E05B 9/06 |
| KR | 100611563 | B1 | * | 8/2006 | E05B 9/00 |
| KR | 20090120132 | A | * | 11/2009 | E05B 47/0012 |
| KR | 20100009777 | A | * | 1/2010 | E05B 47/0012 |
| KR | 20100067217 | A | * | 6/2010 | E05B 47/00 |
| SE | 1151070 | A1 | * | 5/2013 | E05C 9/043 |
| WO | WO-9709501 | A1 | * | 3/1997 | E05B 63/0069 |
| WO | WO-9745613 | A1 | * | 12/1997 | E05B 3/00 |
| WO | WO-2011136535 | A2 | * | 11/2011 | E05B 65/1086 |

* cited by examiner

DOOR LOCK CONTROL DEVICE

BACKGROUND OF THE INVENTION

(a) Technical Field of the Invention

The present invention relates generally to a door lock control device, and more particularly to a door lock control device for use in combination with a spring box of a door lock to selectively set the lock in an unlockable state or an idling state to achieve the anti-theft function and protection against improper damage.

(b) Description of the Prior Art

Since ancient times, the function of door locks is to protect the life and property of the householders. Therefore, the design of door locks has been developed towards the direction of being easy to operate and difficult to be opened by bad people. However, for a long time, most of the indoor door locks and outdoor door locks are mechanical types that use keys to open and close. Such key-controlled door locks are inconvenient because it is easy to forget to bring the key, and the security is also uneven. And, usually, the same family needs to prepare multiple keys, which causes inconvenience and trouble in use.

In recent years, due to the advancement of technology and materials, the robustness and safety of modern locks have been increasingly improved, and especially electronic locks, which are more sophisticated, have been widely developed. However, whether it is a traditional lock or an electronic lock, when the lock is in a locked state, if the user does not understand or the criminals want to forcibly break in, because the lock is difficult to open easily, the user opens it too hard or the criminals force it to open it violently, which may cause the entire lock to be destroyed. Although it can still prevent the intrusion, the damaged lock and door handle still cause considerable losses.

In view of this, the present invention aims to provide a door lock control device that can form an idling state when locked to prevent the lock and door handle from being damaged.

SUMMARY OF THE INVENTION

The primary objective of the present invention is to provide a door lock control device, which is usable in combination with a spring box of a door lock, so as to selectively the lock in an unlockable state or an idling state to realize an anti-theft function and protection of the lock and a door handle from improper damage.

The door lock control device comprises a base, and an actuation member, a rotary disk, a slide rail, and a push block arranged on the base and a transmission unit arranged on a lower side of the base, wherein the rotary disk is arranged in the center of the base, and the actuation member is arranged at one side of the rotary disk and is provided, on a bottom thereof, with a support portion; the slide rail and the push block are arranged along a periphery of the rotary disk; the transmission unit comprises a push bar, with a top end of the push bar received in and in engagement with the support portion of the actuation member. The present invention is provided for use in combination with a spring box of a door lock, and in an actuated state of the transmission unit, the actuation member is driven to push the slide rail toward the rotary disk to enable the rotary disk to drive and move the slide rail and the push block to achieve an unlockable state. In an unactuated state of the transmission unit, the actuation member stays in the original position to set the rotary disk in an idling state so that the lock achieves an anti-theft function and protection against improper damage.

In the aforementioned door lock control device, the rotary disk is provided, on a periphery thereof, with an engagement portion and a protruding bar extending outwards therefrom, wherein the rotary axle comprises a shaft portion for connection to the lock and a hook; and the push block is arranged in a side-by-side manner with respect to the slide rail and is formed with an opening, so that the hook of the rotary axle is in hooking engagement with the opening.

In the aforementioned door lock control device, the transmission unit comprises a solenoid or an electrically-driven gear-based actuator.

In the aforementioned door lock control device, the base comprises a peg, and the slide rail is made in the form of an arc frame sleeved on the peg and slidable with respect to the peg.

DETAILED DESCRIPTION OF THE PREFERRED EMBODIMENTS

Figure 1:
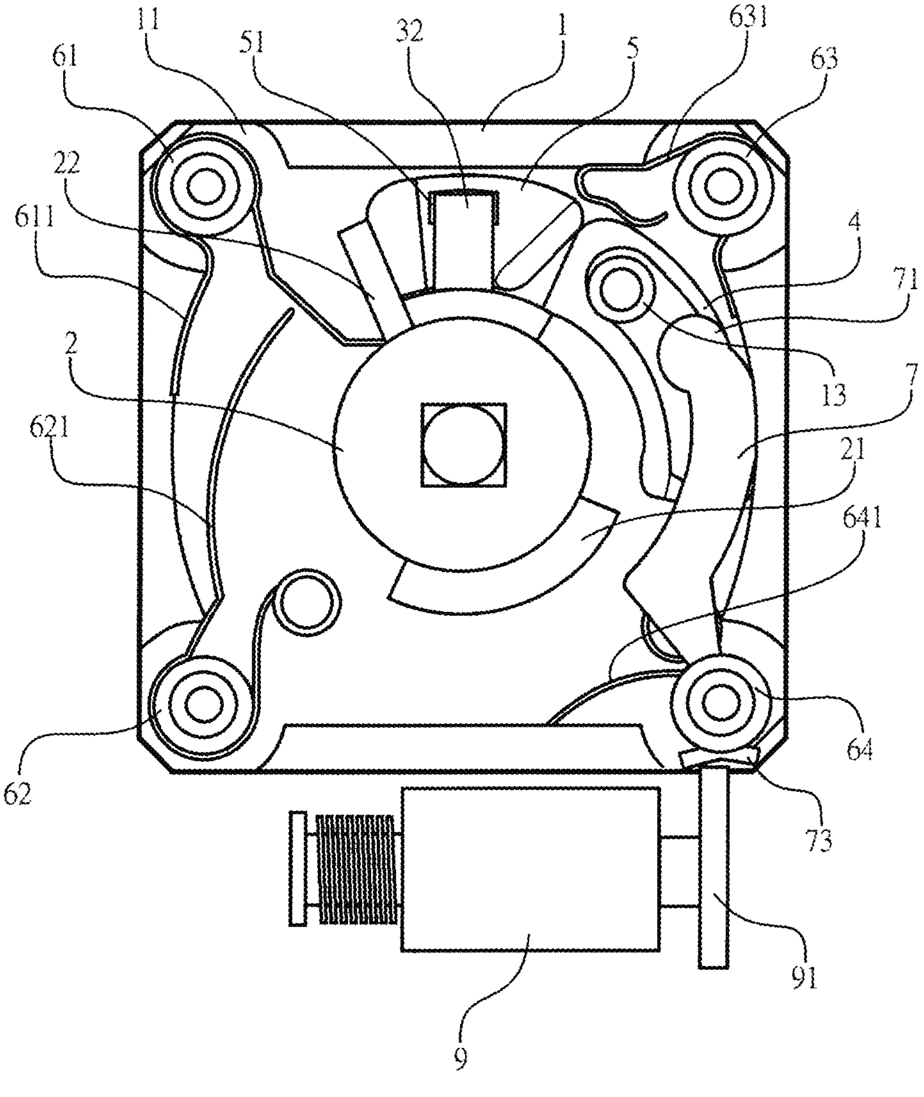
FIG. 1 is a structure diagram of the present invention.
Figure 2:
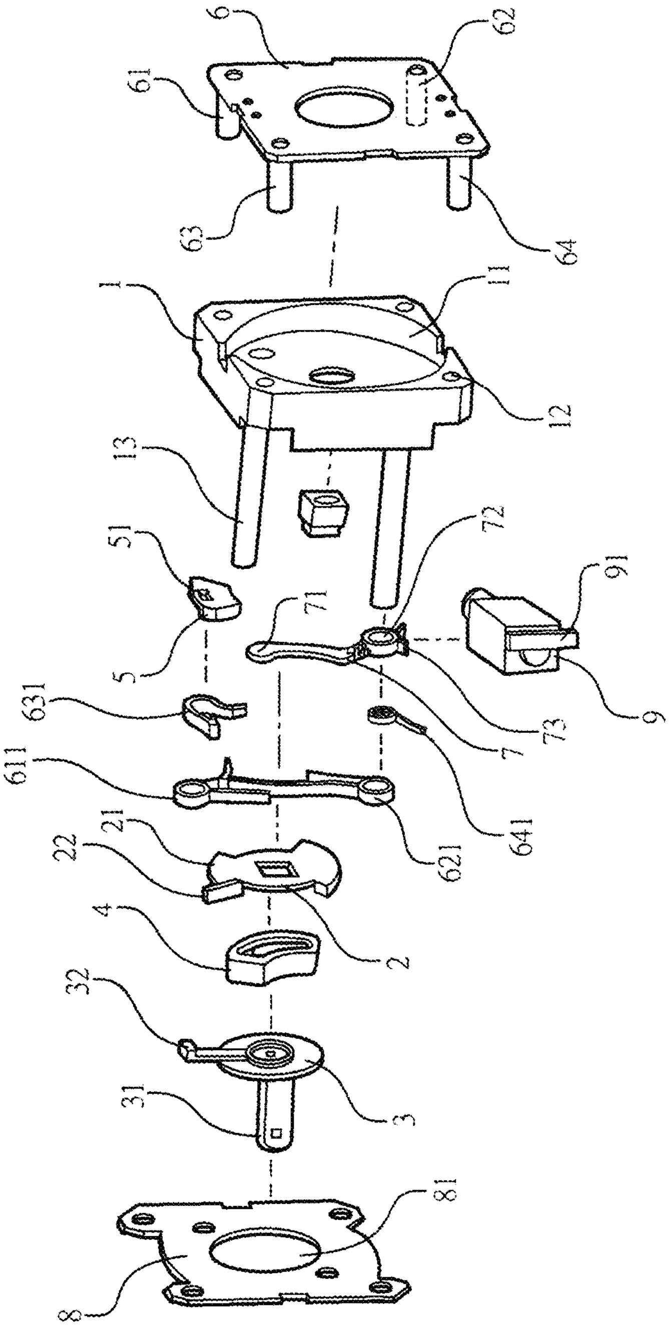
FIG. 2 is an exploded diagram of the present invention.

Referring to FIGS. 1 and 2, which are respectively a structure diagram and an exploded diagram of the present invention, as shown in the diagrams, the present invention comprises a base 1. The base 1 is formed with a trough 11 and is provided with through holes 12 respectively formed in four corners of a peripheral edge thereof. A rotary disk 2 and a rotary axle 3 are arranged at a center of the trough 11. The rotary disk 2 is provided, on a periphery thereof, with an engagement portion 21 and a protruding bar 22 protruding outwards. The rotary axle 3 comprises a shaft portion 31 for connection with a lock and a hook 32.

A slide rail 4 and a push block 5 are arranged along the periphery of the rotary disk 2. The slide rail 4 is in the form of an arc frame and is fit to a peg 13 provided on the base 1 such that the slide rail 4 is slidable along the peg 13 The push block 5 is arranged in a side-by-side manner with respect to the slide rail 4 and is formed with an opening 51, such that the hook 32 of the rotary axle 3 is in hooking engagement with the opening 51.

A front cover 6 comprises a first mounting post 61, a second mounting post 62, a third mounting post 63, and a fourth mounting post 64 respectively corresponding to the through holes 12 of the base 1, such that the first mounting post 61, the second mounting post 62, the third mounting post 63, and the fourth mounting post 64 respectively penetrate through the through holes 12 to thereby have the base 1 covered and closed. A first spring 611 is sleeved on the first mounting post 61; a second spring 621 is sleeved on the second mounting post 62; a third spring 631 is sleeved on the third mounting post 63; and a fourth spring 641 is sleeved on the fourth mounting post 64. The third spring is set to contact and support the slide rail 4 for positioning the slide rail 4.

An actuation member 7 has a top end that is formed with a driving portion 71 in a rounded form and a bottom end that is provided with a ring portion 72. The ring portion 72 is sleeved on the fourth mounting post 64 of the front cover 6, such that the fourth spring 641 is set to contact and support the actuation member 7. A support portion 73 in the form of a sharp concave is formed on a bottom end of the ring portion 72.

A rear cover 8 is set to close and cover the base 1 and is formed, in a center thereof, with an opening 81 in a circular form to allow the shaft portion 31 of the rotary axle 3 to extend therethrough to connect to the lock.

A transmission unit 9 is arranged on a lower side of the base 1. The transmission unit 9 comprises a push bar 91, and a top end of the push bar 91 is received and set in engagement with the support portion 73 of the actuation member 7. In the instant embodiment, the transmission unit 9 is a solenoid or an electrically-driven gear-based actuator.

Through a combination of the above-described components, a door lock control device is formed for use in combination with a spring box of a door lock. In an actuated state of the transmission unit 9, the actuation member 7 pushes the slide rail 4 toward the rotary disk 2, in order to enable the rotary disk 2 to push and move the slide rail 4 and the push block 5 to achieve an unlockable state. When the transmission unit 9 is not actuated, the actuation member 7 stays in the original position, setting the rotary disk 2 in an idling state, so that the lock achieve an anti-theft function and is prevented from being improperly damaged.

Figure 3:
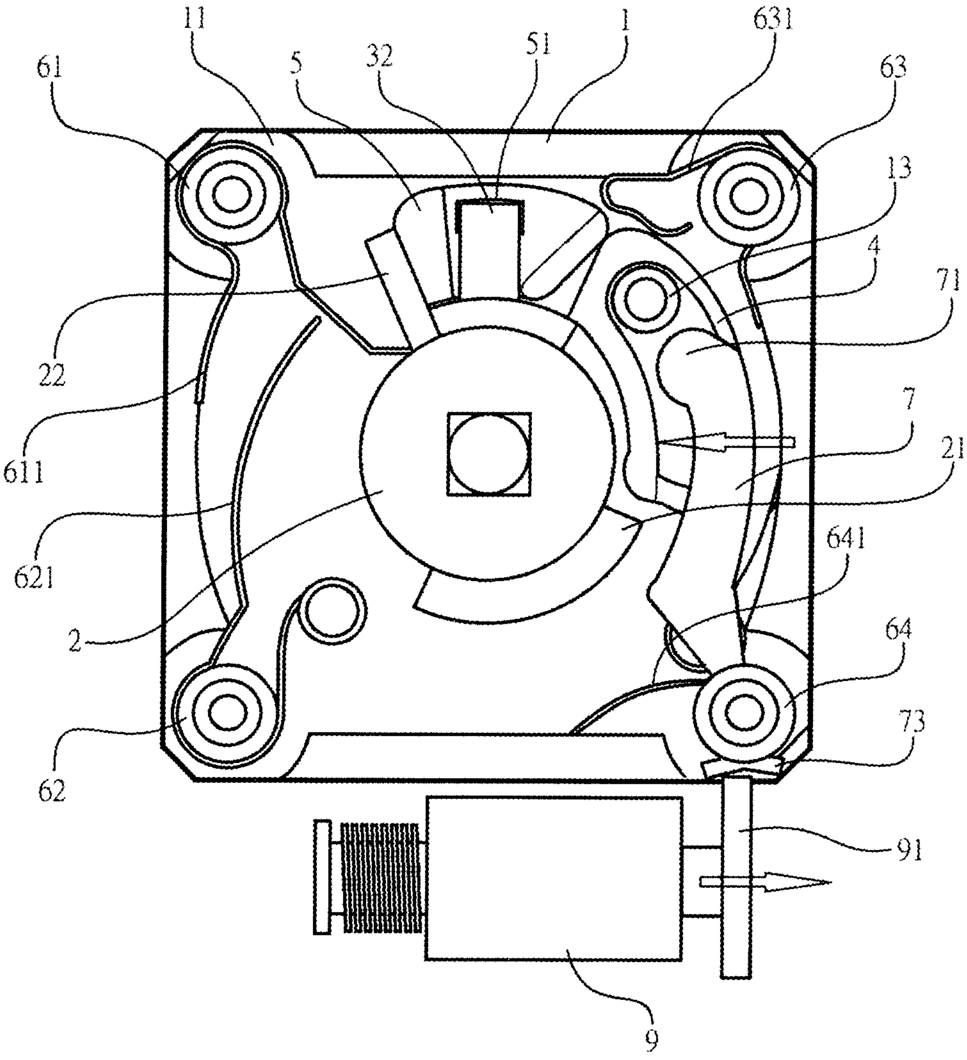
FIGS. 3 and 4 are diagrams illustrating an unlocking operation according to the present invention.
Figure 4:
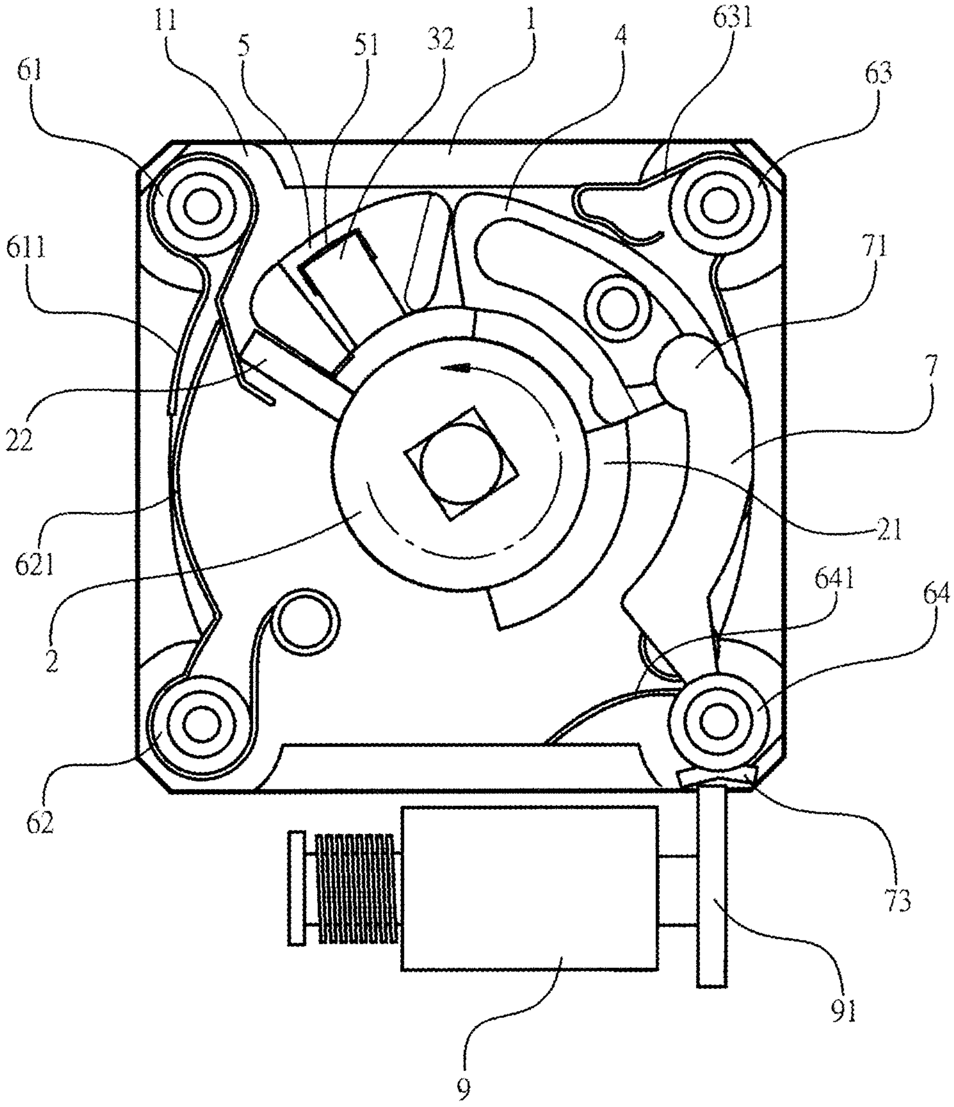

Referring to FIGS. 3 and 4, which are diagrams that illustrate an unlocking operation according to the present invention, as shown in the diagrams, to carry out unlocking with the present invention, the transmission unit 9 is set into the actuated state (where the transmission unit 9 can be connected to a control circuit of for example a card reader or the likes and the transmission unit 9 is actuated through a detection operation, such as card swiping or card sensing), and the push bar 91 of the transmission unit 9 pushes and moves the support portion 73 of the actuation member 7, such that an upper portion of the actuation member 7 rotate in an opposite direction to push and force the slide rail 4 inwards. When the rotary disk 2 is operated through rotation of a handle of the lock, the engagement portion 21 is brought into contact and pushing engagement with the slide rail 4 to thereby simultaneously drive the slide rail 4 and the push block 5 to move, wherein due to the hook 32 of the rotary axle 3 being in hooking engagement with the opening 51 of the push block 5 the movement of the push block 5 causes the rotary axle 3 to rotate thereby drive the lock to realize the unlocking operation. With the rotation of the rotary axle 3, the protruding bar 22 is brought into contact against the first spring 611, so that the rotary disk 2 and the rotary axle 3 can then be biased for position restoration by the spring force of the first spring 611 and the second spring 621. Further, due to the actuation of the transmission unit 9 is released, the actuation member 7 is biased by the spring force of the fourth spring 641 for position restoration.

Figure 5:
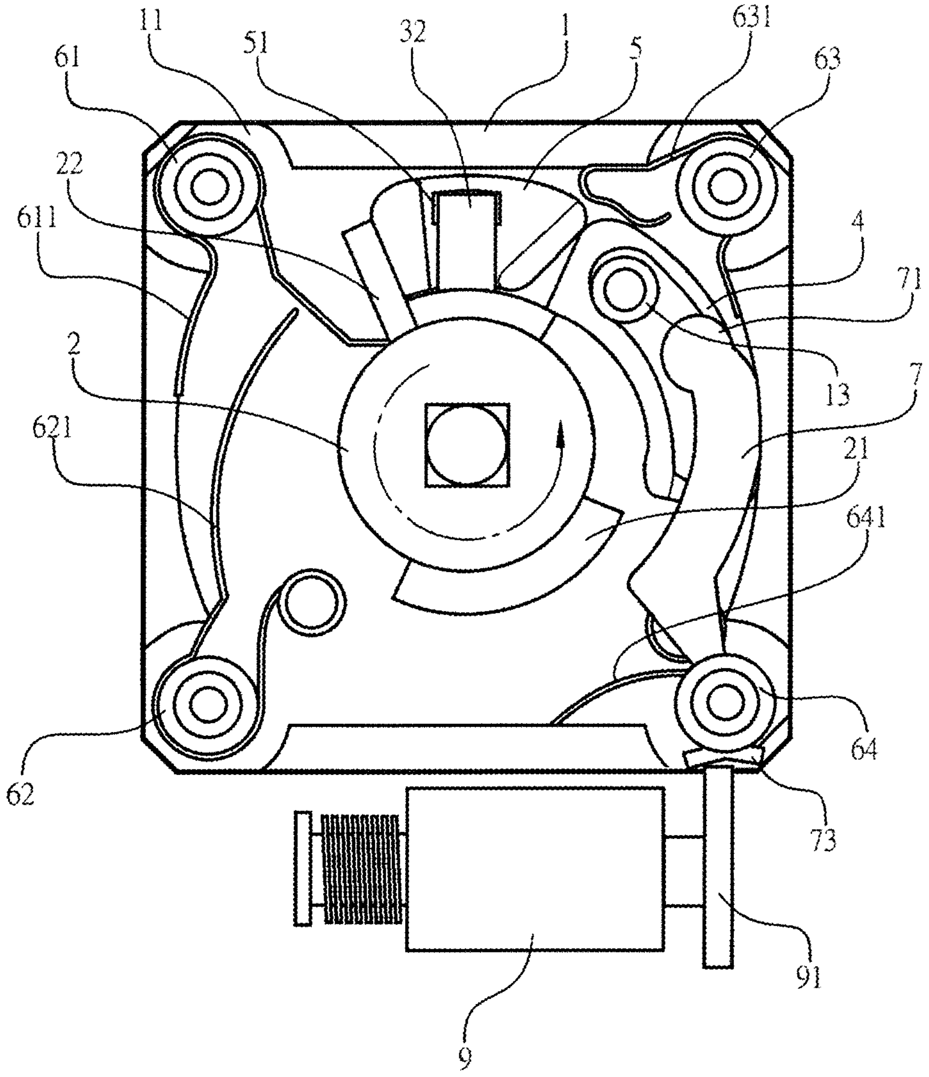
FIGS. 5 and 6 are diagrams illustrating an idling operation according to the present invention.
Figure 6:
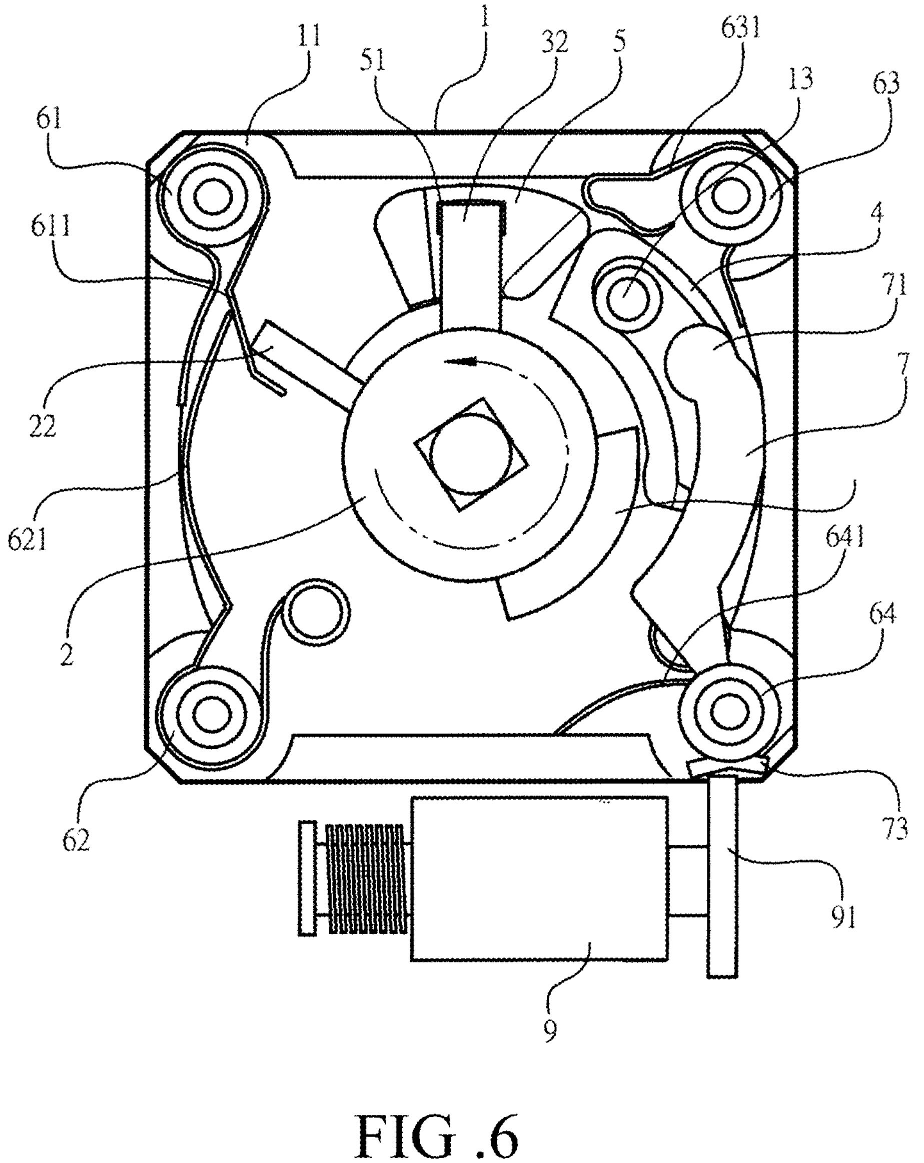

Referring to FIGS. 5 and 6, which are diagrams illustrating an idling operation according to the present invention, as shown in the diagrams, in the present invention, in an unactuated state of the transmission unit 9 (where no detection operation, such as card swiping or card sensing is performed to actuate the transmission unit 9), the push bar 91 of the transmission unit 9 does not push the actuation member 7, and the actuation member 7 is kept in the original position. When the rotary disk 2 is operated through rotation of the handle of the lock, the engagement portion 21 of the rotary disk 2 slides and passes over the slide rail 4 and the push block 5, so that the rotary axle 3 is not rotated and thus not driving the lock to carry out an unlocking operation and an idling state is presented to provide an anti-theft function and protection of the lock and the door handle from improper damage. The rotary axle 3, after being rotated, may be driven by the spring force of the first spring 611 and the second spring 621 to return to the original position.

The above embodiment is provided only for illustrating a preferred way of implementation of the present invention, but not for limiting the scope of the present invention. Any minor modifications and variations will not lose the essence of the present invention and will not deviate from the spirit of the present invention.

In summary, the present invention provides a base that is provided with a rotary disk and an actuation member for use in combination with a transmission unit coupled with the actuation member to form a door lock control device for use in combination with a spring box of a door lock so as to selectively set the lock in an unlockable state or an idling state to realize an anti-theft function and protection the lock and a door handle from improper damage.

I claim:

1. A door lock control device, comprising:

a base, which is formed with a trough, with a peg arranged in the trough, and through holes formed in four corners of a periphery thereof;

a rotary disk, which is arranged in the trough and has a periphery from which an engagement portion and a protruding bar extend outwards;

a rotary axle, which is arranged in the trough and comprises a shaft portion adapted for connection to a lock and a hook;

a slide rail, which is in the form of an arc frame sleeved on the peg of the base and slidable along the peg;

a push block, which is arranged in a side-by-side manner with respect to the slide rail and is formed with an opening, the hook of the rotary axle being in hooking engagement with the opening;

an actuation member, which is arranged at one side of the rotary disk and has a top end provided with a driving portion in a rounded form and a bottom end provided with a support portion in a sharp concave form, the bottom being arranged to form a ring portion;

a front cover, which comprises a first mounting post, a second mounting post, a third mounting post, and a fourth mounting post respectively corresponding to the through holes of the base, the first mounting post, the second mounting post, the third mounting post, and the fourth mounting post respectively penetrating through the through holes for covering and closing the base, the ring portion of the actuation member being sleeved on the fourth mounting post; and a transmission unit, which is arranged on a lower side of the base and comprises a push bar, a top end of the push bar being received in and engaging with the support portion of the actuation member, wherein in an actuated state of the transmission unit, the actuation member is moved to push the slide rail toward the rotary disk to enable the rotary disk to drive the slide rail and the push block to move to achieve an unlockable state, and in an unactuated state of the transmission unit, the actuation member stays in an original position, setting the rotary disk in an idling state to thereby achieve an anti-theft function and protection against improper damage.

2. The door lock control device according to claim 1, wherein a first spring is sleeved on the first mounting post of the front cover and a second spring is sleeved on the second mounting post, wherein through rotation of the rotary axle, the protruding bar is moved into contact engagement with the first spring, such that the rotary disk and the rotary axle are biased by a spring force of the first spring and the second spring for position restoration.

3. The door lock control device according to claim 1, wherein a third spring is sleeved on the third mounting post of the front cover, such that the third spring contacts and supports the slide rail for positioning of the slide rail.

4. The door lock control device according to claim 1, wherein a fourth spring is sleeved on the fourth mounting post of the front cover, such that the fourth spring contacts and supports the actuation member, such that the actuation member, after the movement thereof, is biased by the fourth spring for position restoration.

5. The door lock control device according to claim 1, wherein the transmission unit comprises a solenoid or an electrically-driven gear-based actuator.

* * * * *